United States Patent [19]

Jacobsen

[11] Patent Number: 5,071,314
[45] Date of Patent: Dec. 10, 1991

[54] METHOD AND FISH PUMP FOR PUMPING UP FISH FROM A COD END

[76] Inventor: Solbjorn Jacobsen, Dr. Dahlsgota 13, DK-3800 Torshavn, Denmark

[21] Appl. No.: 525,748

[22] Filed: May 18, 1990

[51] Int. Cl.⁵ .............................................. F03B 15/02
[52] U.S. Cl. ..................................... 415/148; 415/72; 415/166
[58] Field of Search .................... 415/71, 72, 148, 203, 415/206, 75, 182.1, 126, 127, 166; 416/176

[56] References Cited

U.S. PATENT DOCUMENTS

| | | | |
|---|---|---|---|
| 84,237 | 11/1868 | Waite | 415/75 |
| 1,762,708 | 6/1930 | Allred | 415/72 |
| 3,116,602 | 1/1964 | Dahle | 415/148 |
| 3,936,224 | 2/1976 | Nordquist | 415/203 |
| 4,193,737 | 3/1980 | Lemmon | 415/206 |
| 4,514,139 | 4/1985 | Gurth | 415/206 |

FOREIGN PATENT DOCUMENTS 0073769 11/1985 European Pat. Off. .

Primary Examiner—Edward K. Look
Assistant Examiner—Christopher M. Verdier
Attorney, Agent, or Firm—Darby & Darby

[57] ABSTRACT

In order to pump up fish in a gentle manner from a cod end being towed by a vessel by means of a fish pump located at the end of the cod end, a throttle valve for adjusting the admission of the catch to the pump is positioned in the inlet suction channel of the pump. A direct sea water inlet to the pump inlet is provided in the form of openings with throttles for adjustment of the direct sea water inflow. Thus, the ratio between the fish from the cod end and sea water supplied directly to the pump is controlled.

4 Claims, 2 Drawing Sheets

METHOD AND FISH PUMP FOR PUMPING UP FISH FROM A COD END

FIELD OF THE INVENTION

The invention relates to a method of pumping up a fish catch from a cod end while the cod end remains in the water by means of a fish pump arranged on the cod end and by means of a pump hose being connected to the vessel, the fish pump being provided with a motor connected to an energy source on board the vessel, and a fish pump for carrying out the method.

BACKGROUND OF THE INVENTION

Different methods of taking in a fish catch from a cod end are known.

In one method, the cod end is hauled from the water with the catch along a stern ramp on the vessel. If, however, the catch is large, it will be damaged by the compression during the towing.

In a second method, the so-called Norwegian method, the cod end is hauled alongside the vessel in the sea, after which a fish pump from the vessel is fitted on the cod end so that the catch can be pumped on board. The disadvantage of this method is that it can only be performed in relatively calm weather since the bag in rough weather would start to sink, because the buoyancy of the fish is impaired.

In order to overcome these shortcomings, it is known from EP-PS no. 73,769 to arrange a fish pump on a cod end and via a pump hose to pump up the catch while the cod end remains in the sea. For this purpose a radial pump is used having a gate valve fitted in the inlet channel of the pump for opening and closure of the influx of fish to the pump. Moreover, water inlet openings are provided in the channel so that the pump at the beginning when the valve blocks the admission of fish can pump clean sea water, after which the valve is opened and the pumping up of the catch can begin.

However, this known fish pump has the disadvantage that the admission of fish to the pump cannot be adjusted without risking to damage the fish when they pass the valve if the valve is not completely open. Add to this the condition that there is no opportunity for adjusting the water amount between each fish in that the water inlets are permanently open. This means that, in particular, large fish are damaged because they require a larger water volume relative to the fish volume if damage during pumping is to be avoided. Finally, the pump is a radial pump with an outflow direction being inexpedient since this may result in the pump hose being bent so sharply that the flow conditions are badly impaired resulting in possible damage to the fish.

SUMMARY OF THE INVENTION

It is the object of the invention to overcome these shortcomings and drawbacks of the known methods. This is effected by a throttle provided in the suction channel of the fish pump, said throttle being controlled from the vessel and being able to keep out the catch from the pump and to adjust the admission of the catch to the pump. Furthermore, when water can be supplied to the suction channel through inlet openings with adjustable throttles there can be adjustment of the mixture ratio between fish and water in the pump.

A hitherto unknown gentle pumping is hereby achieved in that it may be adapted to the composition and size of the catch and to the speed at which the vessel with its cod end moves in the sea. This permits fish for human consumption to be pumped in a large water volume thereby avoiding damage to the fish. In connection with trash fish, however, the pump capacity may be fully utilized in that the water volume can be reduced relative to the fish volume so that the emptying takes the shortest time possible.

By using a semi-axial pump, the outflow direction from the pump is turned backwards corresponding to the natural course of the pump hose, whereby sharp bending of the hose is avoided.

By designing the throttle as a double-action throttle body, moving synchronously in and out of the channel, the closure will take place from the outside towards the centre of the channel and thereby provide a gentle adjustment of the fish transportation.

Finally, it is expedient, if the throttle bodies open the water inlet openings in their closed position, because this causes the pump always to be started with clean sea water, upon which the gradual opening of the throttle will automatically cause a simultaneous reduction of the water admission which increases the fish pumping capacity.

BRIEF DESCRIPTION OF THE DRAWINGS

In the following the invention will be described in closer detail with reference to the drawing, in which.

DESCRIPTION OF THE PREFERRED EMBODIMENTS

Figure 1:
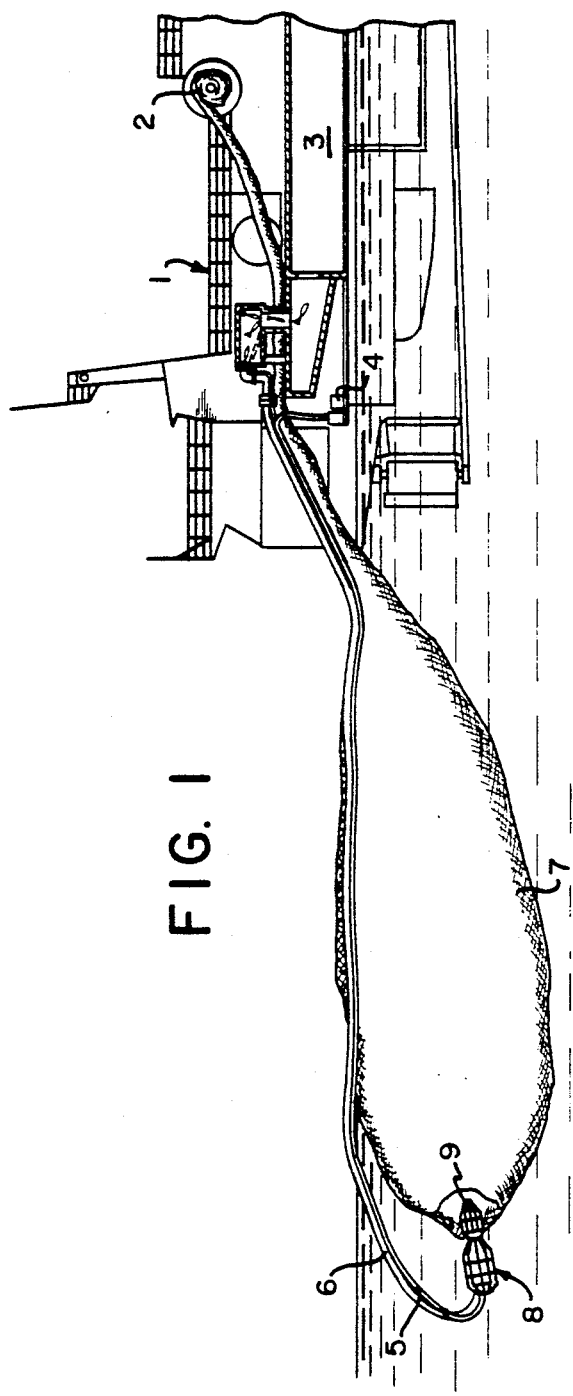
FIG. 1 shows a cod end during emptying.

FIG. 1 shows an example of the operation of the method. In this example the vessel 1 is a trawler with a stern ramp and towing a cod end 7.

On board the vessel, the cod end 7, together with the trawl, is wound onto a winch 2 having a net drum. At its end the cod end is provided with a fish pump 8 having a basket portion g situated inside the cod end 7 and surrounded by the (not shown) fish catch. The pump part situated outside the cod end is connected with a hose 6 extending along the cod end to the vessel. Moreover, hydraulic pipes 5 extend between the hydraulic system 4 of the vessel and the hydraulic motor 12, (vide FIG. 6), which drives the pump, and the valve actuator 20, (vide FIG. 5), which operates the valve throttles.

Instead of a hydraulically operated pump, the pump may also be electrically driven, and the power supply to the motor 12 and the actuator 20 may be supplied through cables 5.

Figure 2:
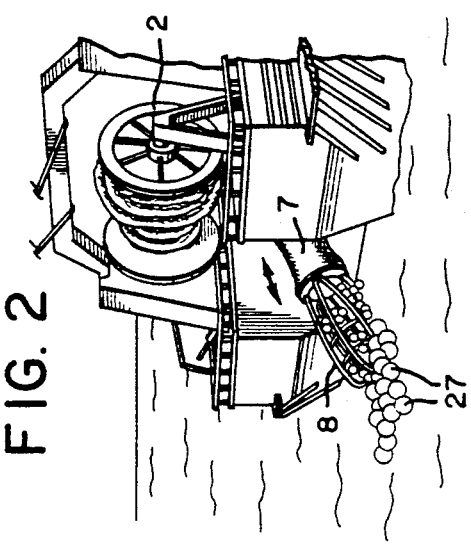
FIG. 2 shows the cod end with fish pump on the stern ramp of the vessel.

As shown in FIG. 2, the fish pump 8 is provided with a number of buoyancy balls 27 or the like so that the fish pump 8 will not weigh down the cod end during fishing and pumping.

Figure 3:
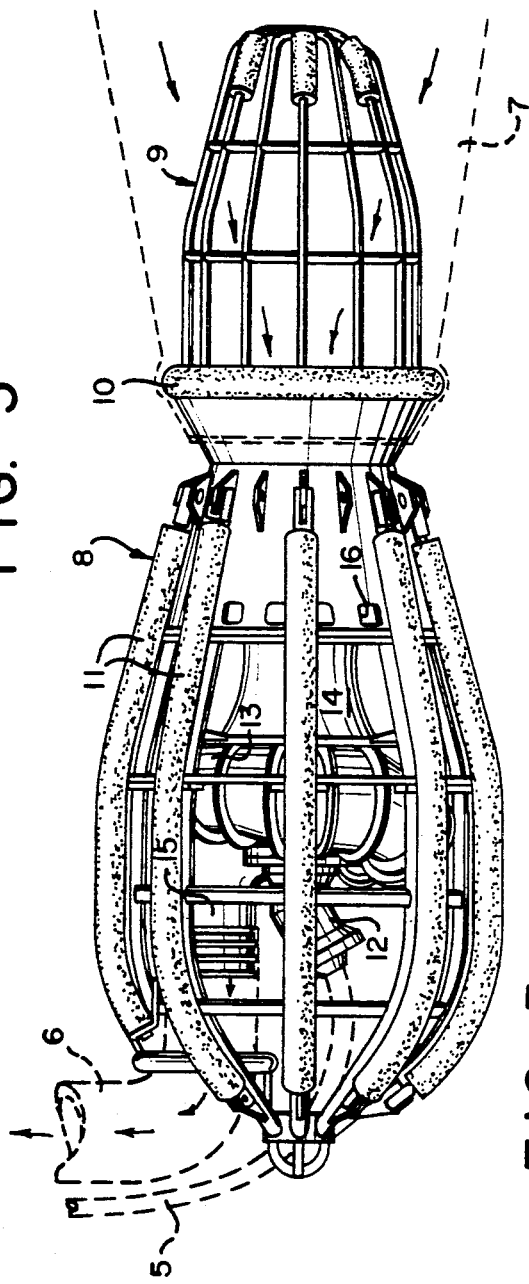
FIG. 3 is a side view of the fish pump proper.

The fish pump proper is shown in FIG. 3. It comprises a basket portion 9 which is inside the cod end 7 as indicated by the dotted line. Between this basket portion g and the fitting part 10 the net 7 is attached to a tapered fitting part by a lashing or the like.

Figure 4:
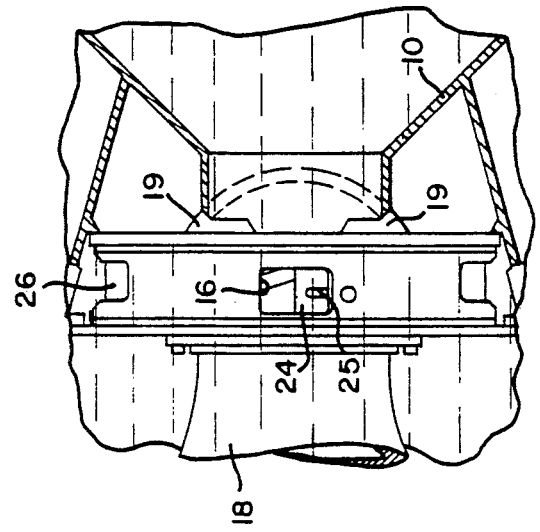
FIG. 4 is a partial view of the throttle and the water inlet part.

As shown in FIG. 4 there is passage through the fitting part 10 so that the catch can be supplied to the suction channel 18 of the pump. In this channel 18 a throttle is arranged comprising the parts shown in FIG. 5, viz. two throttle parts 19 being pivotable around an axle 21, said throttle parts being interacting for instance by means of a generally known pinion so that if a hydraulic cylinder 20 or a similar actuator turns one throttle body 19 around the shaft 21 the other throttle body will move synchronously.

If the throttle bodies 19 are large or heavily weighted, an actuator 20 can be provided on each throttle body 19. This also increases their reliability should one actuator 20 stop working.

Figure 5:
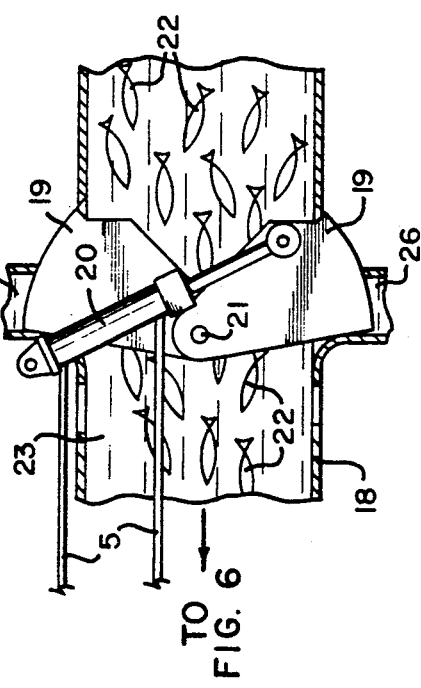
FIG. 5 shows the throttle in its completely opened position.

In this manner the channel 18 can be opened as shown in FIG. 5 and continuously can be shut in a brought-together position shown by dotted lines in FIG. 4, where the channel 18 is completely blocked. The curved throttle bodies are furthermore capable of withstanding a considerable pressure.

Near the throttle, the channel 18 includes through openings 16 and inlet channels 26, as shown in FIGS. 3 and 4, for entry of water 23 from outside the cod end into the channel 18. These openings in the channel wall are adjustable by means of sliding throttles 24 provided with a groove 25 in which a bolt is inserted so that the throttle 24 can be attached in any required position and thereby define the opening of the associated inlet channel 26.

Two or more channels 26 are, as shown in FIG. 4, self-adjusting in that the throttle bodies 19 in their closed position, will be entirely clear of the channel, which is thus completely open, thereby permitting a large water influx for instance when starting the pump. The channel and pump hose are hereby thoroughly scavenged for fish remnants before new fish are added to the pump.

By opening of the valve, the valve bodies 19 turn out to the positions shown and they will shut off the water flow to the suction channel 18 through the channels 26.

This makes it possible to adjust the water supply to the pump in advance by adjusting the sliding throttles 24 in accordance with the composition and character of the catch and thereby to adjust the ratio between the water volume and the pumped up fish volume.

Figure 6:
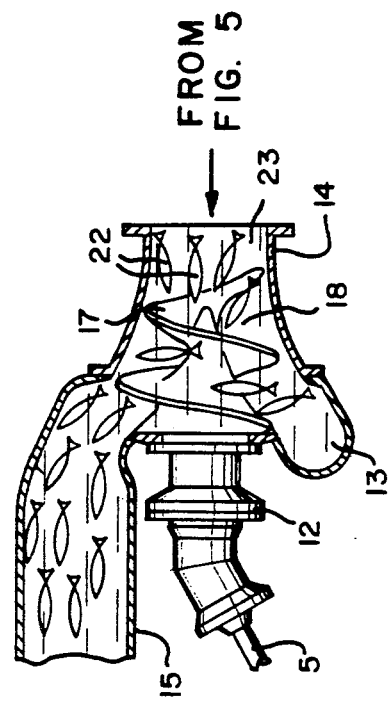
FIG. 6 is a sectional view of the pump housing and the pump wheel.

As shown in FIG. 6, the suction channel 18 leads to the actual flow pump which is provided with a pump wheel 17 designed as a propeller blade and having a pump housing 13 in the form of a spiral housing. This gives a semi-axial outflow to the discharge nozzle 15 to which a hose 6 is attached.

The pump is driven by a hydraulic motor 12 which through hydraulic pipes 5, is supplied with the driving pressure required for operation of the pump.

On the outside, the fish pump 8 is provided with a number of protection bars 11 which, as shown in FIG. 3, may be padded in order to reduce the shock elements on the fish pump 8.

When the cod end 7 is hauled up to the ship while the catch remains in the sea, as shown in FIG. 1, the pump hose 6 and the hydraulic pipes 5 are connected on board the vessel to form interacting hoses or pipes, after which pumping can take place. When the pumping has been completed, the hoses are disconnected by being separated at the joints, and the hose ends are attached to the cod end. Then the cod end and trawl are returned to their fishing position with the throttle closed. This means that the fish pump is permanently fitted with hoses on the trawl/cod end.

I claim:

1. A fish pump for pumping up a fish catch through a hose leading to an associated vessel from a cod end connected to said vessel while the cod end remains in water, said fish pump being positioned on said cod end, comprising:

motor means for operating said fish pump;

a flow channel having an inlet suction channel and a discharge channel, said inlet suction channel being adapted for opening into an interior of said cod end, said inlet suction channel expanding radially in an axial direction of flow, said discharge channel being radially offset and extending parallel to the flow axis of said inlet channel, said discharge channel being constructed for connection to said hose leading to said vessel;

an impeller located at least in part within said radially expanding portion of said inlet channel, said motor means being connected to said impeller;

a throttle valve within said flow channel upstream of said inlet channel, said throttle valve being subject to operation in a first position in which said inlet channel is blocked, and in a second position in which said inlet channel is open for flow connection through said valve with the interior of said cod end;

an actuator for moving said throttle valve between said first and said second positions; and a plurality of supplemental water inlet openings to said flow channel for producing open connections between the inlet channel of said fish pump and the water surrounding said cod end, said inlet openings including means for adjusting the size of said inlet openings, a selected size of said inlet openings determining a ratio of the water drawn from said cod end and through said inlet openings, when said pump operates.

2. A fish pump as in claim 1, wherein said throttle valve includes at least to throttle parts movable by said actuator to block said flow channel in said first position of said valve and to unblock said channel in said second position of said valve, in said first position of said valve, said throttle parts not obstructing said supplemental water inlet openings, and in said second position of said throttle valve, said throttle parts closing off at least a portion of said supplemental inlet openings.

3. A fish pump as in claim 1, further comprising a convergent conical segment connected at the inlet channel to the flow channel of said pump, and a basket positioned within said convergent segment, said basket extending from said segment for positioning inside said cod end, said conical segment being dimensioned for attachment of said cod end thereto.

4. A fish pump as in claim 2, further comprising a convergent conical segment connected at the inlet channel to the flow channel of said pump, and a basket positioned within said convergent segment, said basket extending from said segment for positioning inside said cod end, said conical segment being dimensioned for attachment of said cod end thereto.

* * * * *